United States Patent [19]

Wade et al.

[11] Patent Number: 4,929,350
[45] Date of Patent: May 29, 1990

[54] ROTARY SCREW FISH COLLECTOR

[76] Inventors: Mark G. Wade, 1005 SE. Park, Corvallis, Oreg. 97330; Kenneth R. Kenaston, P.O. Box 991, Philomath, Oreg. 97370

[21] Appl. No.: 395,731

[22] Filed: Aug. 2, 1989

Related U.S. Application Data

[63] Continuation-in-part of Ser. No. 256,589, Oct. 12, 1988, abandoned.

[51] Int. Cl.⁵ .................. B01D 33/02; B01D 35/02
[52] U.S. Cl. .................................. 210/157; 210/156; 210/161; 210/242.1; 210/354
[58] Field of Search ............ 210/156, 157, 161, 242.1, 210/354; 43/100, 103, 104; 405/81, 82, 83

[56] References Cited

U.S. PATENT DOCUMENTS

| | | | |
|---|---|---|---|
| 1,516,693 | 11/1924 | Anthony | 210/242.1 |
| 3,151,068 | 9/1964 | Long et al. | 210/156 |
| 3,527,349 | 9/1970 | Lynch | 210/156 |

FOREIGN PATENT DOCUMENTS

| | | | |
|---|---|---|---|
| 56-89612 | 7/1981 | Japan | 210/157 |
| 647397 | 2/1979 | U.S.S.R. | 405/81 |

OTHER PUBLICATIONS

Conlin and Tutty, "Juvenile Salmonid Field Trappind Manual", Fisheries and Marine Service Manuscript Report #1530, Aug. 1979, Dept. of Fisheries and Oceans, Vancouver B.C.

Humphreys, Game Biologist, Oregon State Game Commission, "Self-Cleaning Downstream Migrant Trap", Jul. 1967.

Stone and Webster Engineering Corp., "Assessment of Downstream Migrant Fish Protection Technologies for Hydroelectric Application", Sep. 1986, EPRI AP-4711.

Bates, "Diversion and Collection of Juvenile Fish with Traveling Screens", U.S. Dept. of the Interior, U.S. Fish and Wildlife Service, Fishery Leaflet 633 3/1970.

*Primary Examiner*—W. Gary Jones
*Attorney, Agent, or Firm*—James D. Givnan, Jr.

[57] ABSTRACT

A porous, conical structure for submersion in a body of water for rotation by water action. A screw blade in the structure confines as well as propels fish toward an outlet end of the porous structure. A support structure for the porous, conical structure may be embodied in a buoyant platform while a modified form of the collector utilizes a permanent ground supported structure. A receptacle is provided at the outlet end of the porous, conical structure for reception of fish and other collected matter. The receptacle may be a walled structure or the end of a bypass conduit enabling diversion of the collected matter and water away from the body of water. A lift and pivoted bearing permit elevating of porous, conical structure from the body of water.

20 Claims, 2 Drawing Sheets

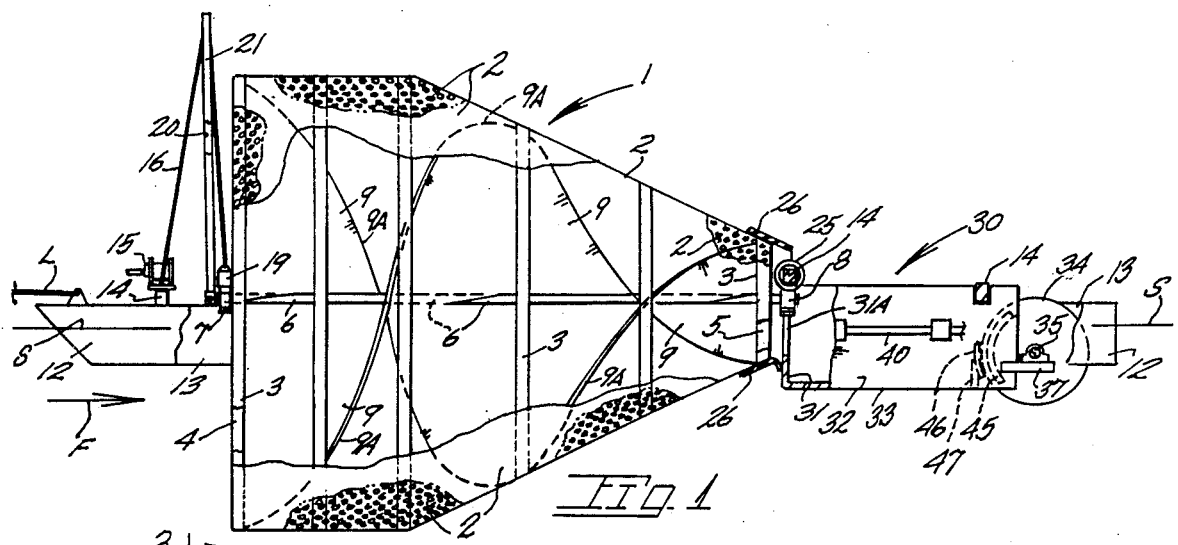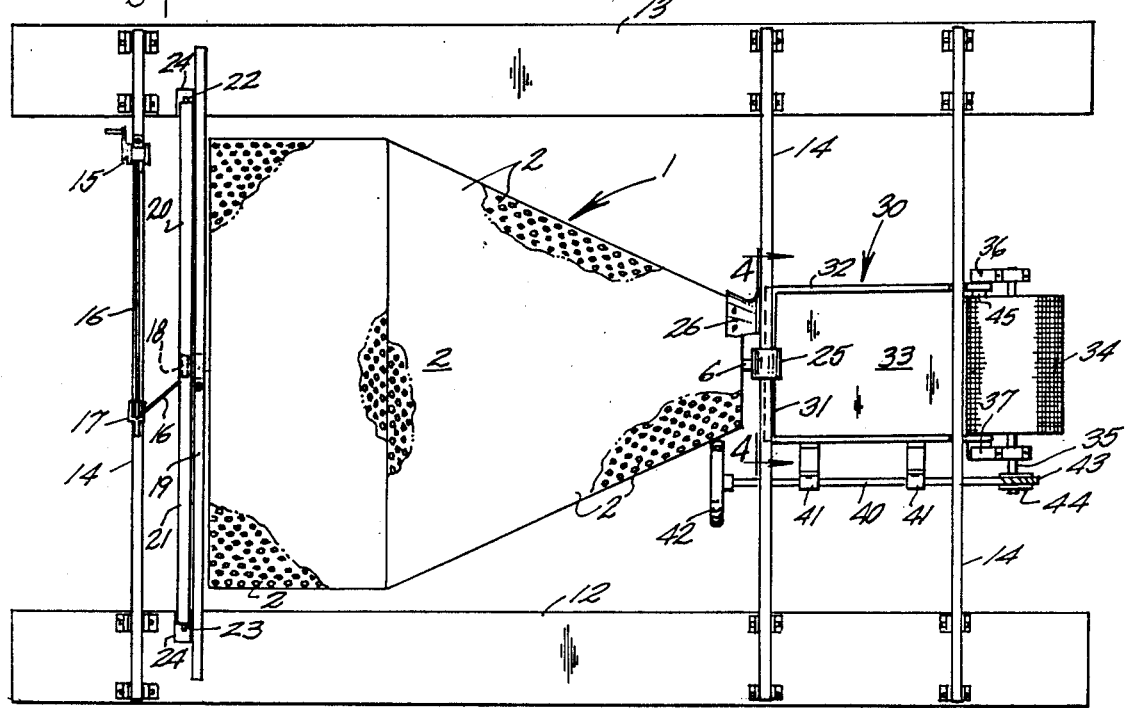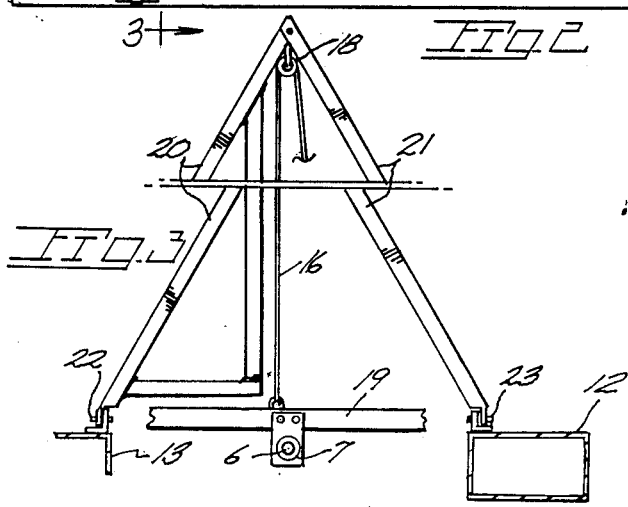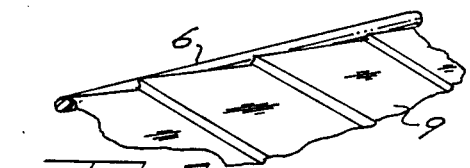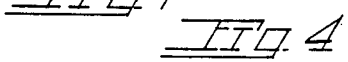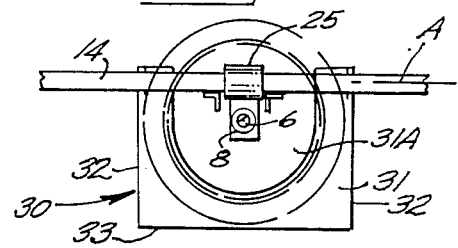

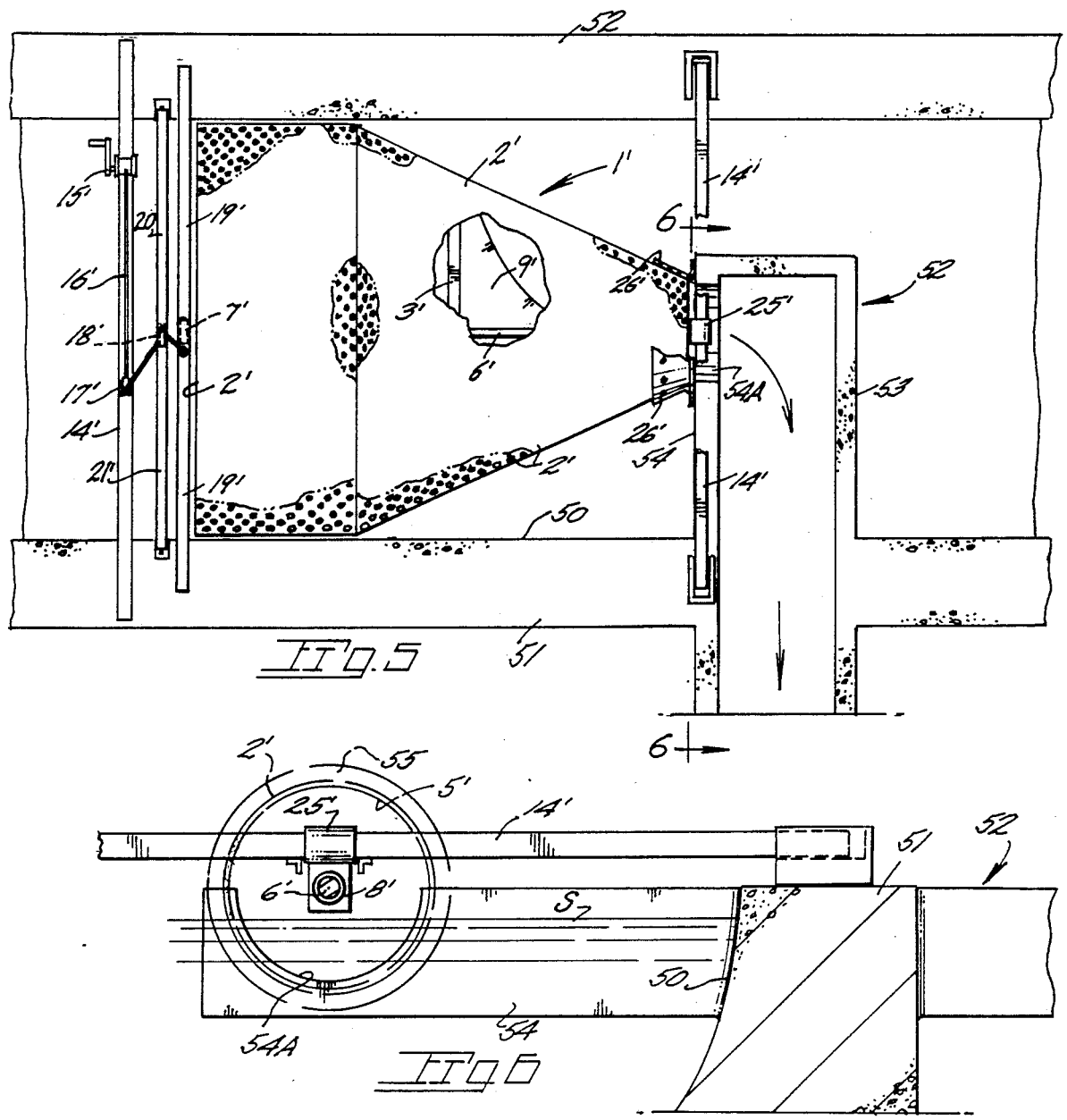

ROTARY SCREW FISH COLLECTOR

This is a continuation-in-part of our copending application Ser. No., 07/256,589 filed Oct. 12, 1988, now abandoned.

BACKGROUND OF THE INVENTION

The present invention relates generally to fish capturing devices. and more specifically to a rotary apparatus for removing fish from a stream, river, canal or other body of water.

Earlier devices for the capture of fish have varied widely in construction and effectiveness as summarized by Conlin and Tutty in their Fisheries and Marine Service Manuscript Report #1530 of the Canadian Department of Fisheries and Oceans. W. R. Humphreys discloses a self-cleaning fish trap in a 1967 Oregon State Game Commission Report. A continuous belt moves fish upwardly along an inclined plane for discharge into a tank. The efficiency of the trap is diminished somewhat by the fish, upon sensing an obstruction, escaping in a lateral direction. Stone and Webster Engineering Corporation for the Electric Power Research Institute of Palo Alto, CA, published in 1986 a report titled Migrant Fish Protection Technologies for Hydroelectric Application, EPR: AP 4711 which provides a review of fish screening technology for hydroelectric projects.

A disadvantage common to prior apparatuses is the narrow range of water velocities under which they are effective. For example, rotary drum screens and traveling screens require low approach velocities to prevent fish impingement on the screens while other fish traps require high approach velocities of the fish for capture. In addition, known traps are cumbersome and difficult to move to new locations.

Nets and fixed screens are subject to becoming plugged with debris rendering them inoperable and injurious to fish. Rotary drum screens, mounted perpendicular to the current, while overcoming debris loading problems, are generally ineffective at guiding fish into collection systems. Rotary drum screens, positioned obliquely to the current flow, are more effective at guiding fish but rapidly lose any debris removing capability. Further, known traveling screens are mechanically complex and hence expensive to construct and maintain.

A water powered, self-cleaning debris collector in U. S. Pat. No. 3,527,349 has a porous shell that removes debris from water but discharges all water through a porous shell. A ring of turbine blades define an unobstructed central area which allow fish to escape out the upstream end of the shell. Debris passes through the shell by means of gravity. Russian Patent No. 647397 discloses a screw blade in a conduit for diverting fish and debris.

SUMMARY OF THE PRESENT INVENTION

The present invention is embodied in a fish collector having a screw blade driven by water acting thereon which, in conjunction with a porous enclosure, confines fish and/or debris for passage to a discharge site.

Water passage imparts rotation to the screw blade located inside a perforate or screen enclosure of generally frustoconical shape with said blade in effect providing a rotating traveling partition which propels a quantity of water to a discharge point along with the collected objects.

The present collector may be assembled at a site and is suited for light truck transport for installation along a natural or artificial watercourse e.g., streams or diversion canals with a floating or fixed support structure. A screen is of frustoconical shape having a screw shaped means therein which, with the screen, confines fish and/or debris for travel to an outlet end of the screen. Adjustable means coupled to the screen permit lifting of the screen relative the water surface. A receptacle into which fish and/or debris is deposited may be supported by the buoyant support structure or part of a fixed by-pass system.

Objectives of the present apparatus include the provision of a rotary fish collector which effectively captures and confines fast swimming fish without injury and is water powered, self-cleaning and lightweight; the provision of an apparatus effective over a wide range of water velocities and of few parts thereby reducing the cost of construction and maintenance while increasing reliability; the provision of a fish collector which be lightweight and portable and inexpensive to build, operate and maintain; the provision of a collector which requires no head loss.

Further objects and advantages of the rotary screw fish collector will become apparent from a consideration of the drawings and ensuing description of it.

BRIEF DESCRIPTION OF THE DRAWINGS

In the accompanying drawings:

FIG. 1 is a side elevational view of the present collector shown operatively disposed;

FIG. 2 is a plan view of FIG. 1;

FIG. 3 is a vertical sectional view taken along line 3—3 of FIG. 2 and sectioned for purposes of illustration;

FIG. 4 is a vertical sectional view taken along line 4—4 of FIG. 2;

FIG. 5 is a plan view of a modified form of the collector;

FIG. 6 is a vertical sectional view taken along line 6—6 of FIG. 5; and

FIG. 7 is an enlarged fragmentary view of the screw blade.

DETAILED DESCRIPTION OF THE PREFERRED EMBODIMENTS

The present application is a continuation-in-part of our earlier pending application filed Oct. 12, 1988, and accorded Serial No., 07/256,589.

With continuing attention to the drawings wherein applied reference numerals indicate parts similarly hereinafter identified, the reference numeral 1 indicates generally a perforate tubular structure of the present invention.

The structure includes screen 2 of frustoconical shape of woven wire supported by a series of axially spaced, circular frames at 3. An inlet opening is at 4, disposed upstream to a water flow per arrow F, while an outlet opening is at 5. Shaft means at 6 is concentric with the screen and extends therebeyond for journalled reception in radial thrust bearings at 7 and 8.

A screw blade at 9 is axially located within screen 2 with a helical outer edge at 9A of the blade suitably secured to the screen and frames 3 while an inner edge of the blade is secured to shaft means 6 in a helical manner as by a weld. To facilitate manufacture of the screw blade it may be formed in sections. Each section having a forwardly or upstream orientated edge contiguous with rearward or downstream edge secured of a forwardly adjacent section. Further, when the screw blade is of sheet metal construction, the member includes radially extending bent portions which permit shaping of the metal blade in a helical manner. The screw blade may be formed in twin halves, as shown, with each of same attached to screen 2 and shaft means 6. Struts may be provided between the frames and shaft means 6.

A support structure includes a buoyant platform shown as a pair of pontoons 12 and 13 suitably joined to one another by detachably mounted cross members 14. For positioning of rotatable structure 1 relative the pontoons, lift means includes a winch 15 mounted in place on the platform on one of said cross members. A winch line at 16 is routed through pulleys 17 and 18 and terminates at a lift beam 19 which carries bearing 7. Pulley 18 is located above and forward of rotatable structure 1 adjacent the apex of a bipod having legs 20–21. The legs 20–21 are swingably mounted at their lower ends by pivot pins 22–23 insertable in brackets 24 on the pontoons.

The outlet end of the perforate structure 1 is pivotally supported by bearing at 8 in which shaft means 6 is journalled with the bearing adapted for rotational displacement about a horizontal axis at A. One suitable bearing arrangement includes suspending bearing 8 below a sleeve 25 pivotally mounted on a support structure cross member 14. Accordingly structure 1 may be positioned by winch operation to lift and lower said structure relative to pontoons 12, 13 and the water surface at S. An annular, flexible seal is at 26 to confine discharged fish.

Located immediately rearward of the screen is a fish receptacle, generally at 30, in which is deposited, for temporary containment, collected fish and/or debris. The receptacle, in one form, is a boxlike structure having a partial front wall 31, an opening 31A (FIG. 4), a pair of sidewalls 32 and a bottom wall 33. The sidewalls terminate upwardly with cutout areas for the reception of two cross members 14 joining the pontoons. The receptacle is closed at its rearward end by a horizontally disposed, perforate drum 34 having a chordal portion in the receptacle. A shaft 35 is journalled within a pair of bearings on arms 36, 37 which project rearward from the sidewalls of the boxlike receptacle. As the drum is rotated about its axis, as explained below, debris is lifted from the receptacle and discharged into the body of water.

Drive means for rotating drum 34 may utilize rotatable porous structure 1 as a power source with power transmission means including a shaft 40 journalled in receptacle mounted bearings 41 with the shaft provided at its forward end with a wheel 42 disposed for rolling contact with the rearward exterior portion of structure 1. Shaft 40 terminates rearwardly in a worm 43 driving a worm wheel 44 on drum shaft 35. To prevent escape of fish or debris from receptacle 30, the receptacle sidewalls 32 are provided on their inner wall surfaces with seals as at 45. Further, the drum periphery rotates in contact with a horizontally disposed seal 46 carried by a truncated rear wall 47 of the receptacle. Accordingly, perforate drum 34 receives a flow of water borne particles of debris which, upon drum rotation, are returned to the body of water. The size of the openings in the drum surface is such as to confine small fish within the receptacle while permitting virtually unobstructed water flow from receptacle 30.

In the modified form of the collector shown in FIGS. 5 and 6, the support structure is altered by dispensing with the buoyant platform earlier provided. An artificial watercourse 50 includes a fixed, ground supported structure 51 such as a man-made canal on which support cross members 14' are positioned. Parts of the modified structure are identified by prime reference numerals which correspond to like reference numerals used to indicate parts of the first described form of the invention. A perforate tubular structure at 1' includes a screen 2' and a screw blade 9' on shaft means 6' which is journalled in bearings at 7' and 8' in place, respectively, on a lift beam 19' and a cross member 14'. A winch 15' and line 16' serve to elevate structure 1'. A receptacle, generally at 52, is in the form of a laterally directed conduit at 53 which receives the fish and/or debris and water taken from the watercourse. An upstream or frontal wall surface 54 of conduit 53 defines an opening 54A through which enters a water flow from screen outlet 5'. A seal at 55 on screen 2' engages receptacle wall 54 to prevent fish escape back to the watercourse. If so desired, the modified version of the collector may utilize a walled receptacle of the type initially described with the preferred form of the invention as well as a rotatable drum associated with said receptacle.

With attention again to rotatable, perforate structure 1, the screw blade has been successfully formed both from sheet metal and fiberglass with the former having radially (relative shaft means 6) extending bent portions to permit helical shaping of the screw blade. While the screw blade shown comprises diametrically disposed blade components, it will be appreciated that the screw blade may comprise any number of axially offset helical blade components to best suit the water and fish conditions at hand. While the collector is shown and described as being in place in a body of water having a current flow, it is to be understood that the preferred form of the collector may be pulled by a watercraft through a body of water having no current flow.

A significant feature of the present collector is the presence of collector surfaces which are oblique to fish movement to avoid injurious contact and to minimize slowing of water flow which, in other collectors, alerts the fish and results in avoidance of the collector.

With regard to screen 2, the same may be formed from perforate sheet metal and attached to the circular frames 3 by pop riveting or other suitable fasteners.

In use the collector is disposed in a body of water, such as a stream or river, and anchored or tethered as by line L against displacement by the water current. The porous structure is then lowered so as to position shaft means 6 proximate water surface S. Accordingly collected fish in a continuous water flow are discharged from outlet 5 into receptacle 30.

While we have shown but a few embodiments of the invention, it will be apparent to those skilled in the art that the invention may be embodied still otherwise without departing from the spirit and scope of the invention.

Having thus described the invention, what is claimed and desired to be secured by a Letters Patent is:

1. A fish and debris collector for use in a body of water, said collector comprising,
a support structure including bearing means, and
a porous structure including a screen of frustoconical shape, said screen having an inlet end opening and an outlet end opening the latter being lesser size than said inlet end opening, shaft means journalled in said bearing means, a tapered screw blade located interiorly of said screen and having an outer edge attached to said screen, said screw blade submersible in the body of water, said screw blade comprising means for rotating said porous structure by water acting on said screw blade whereby submerged spaced apart segments of the screw blade in conjunction with the screen effect a traveling enclosure for the fish for the transfer of same and water borne debris to the outlet opening of the structure.

2. The collector claimed in claim 1 wherein said support structure includes a buoyant platform.

3. The collector claimed in claim 1 wherein said support structure includes a permanent installation fixedly in place on a ground surface.

4. The collector claimed in claim 1 including a receptacle embodied in a walled structure in communication with the outlet end opening of the porous structure.

5. The collector claimed in claim 4 wherein said receptacle is a bypass conduit wherein fish and debris are carried away from the body of water.

6. The collector claimed in claim 4 wherein said receptacle defines an opening in horizontal alignment with the outlet opening of the porous structure, a seal extending intermediate said porous structure and said receptacle.

7. The collector claimed in claim 6 wherein said seal is of annular shape.

8. The collector claimed in claim 4 additionally including a cleaning drum, an accurate surface of said drum at all times in said receptacle, said drum having a perforate cylindrical wall, drive means rotating said drum whereby debris collected on the drum wall is carried back to the body of water for discharge.

9. The collector claimed in claim 1 wherein said screw blade has radially disposed irregular surface areas permitting the screw blade to be constructed from sheet metal.

10. The collector claimed in claim 1 wherein said support structure includes upright support members, manually adjustable lift means carried by said support members for elevating said porous structure.

11. The collector claimed in claim 10 wherein said support structure additionally includes pivot means permitting movement of the porous structure about a horizontal axis.

12. A collector for solids from a body of water, said collector comprising, a tubular structure with a porous outer member with a major axis for disposition substantially parallel to the surface of the body of water, said member having an inlet opening and an outlet opening the latter of lesser area than said inlet opening, a tapered screw blade having an outer edge attached to said outer member, first and second blade ends one each disposed in said inlet opening and said outlet opening, said tapered screw blade comprising means for imparting rotation to said tubular structure by water acting on said tapered screw blade, said screw blade having spaced apart segments which in combination with an expanse of said porous outer member therebetween constituting an enclosure for the solids with rotation of the screw blade urging said solids toward said outlet opening, and a support structure rotatably supporting said tubular structure.

13. The collector claimed in claim 12 additionally including a receptacle in communication with said outlet opening of said porous outer member.

14. The collector claimed in claim 13 wherein said support structure includes a buoyant platform, said receptacle carried by said platform.

15. The collector claimed in claim 12 wherein said support structure is ground supported.

16. The collector claimed in claim 15 wherein said receptacle is a bypass conduit for removal of the solids from the body of water.

17. The collector claimed in claim 12 wherein said support structure includes lift means for elevating said tubular structure.

18. The collector claimed in claim 17 wherein pivot means couples said tubular structure to said support structure permitting elevation of said tubular structure about a horizontal axis.

19. A fish and debris collector for use in a body of water, said collector comprising, a porous structure including a screen of frustoconical shape, said screen having an inlet end opening and an outlet end opening the latter being lesser size than said inlet end opening, shaft means adapted for journalled reception in a support structure, a tapered screw blade located interiorly of said screen and having an outer edge attached to said screen, said screw blade submersible in the body of water, said screw blade comprising means for rotating said porous structure by water acting on said screw blade whereby submerged spaced apart segments of the screw blade in conjunction with the screen effect a traveling enclosure for the fish for the transfer of same and water borne debris to the outlet opening of the structure.

20. The collector claimed in claim 19 including a receptacle embodied in a walled structure in communication with the outlet end opening of the porous structure.

* * * * *